United States Patent
Chang

(10) Patent No.: US 6,684,022 B2
(45) Date of Patent: Jan. 27, 2004

(54) MANUAL VARIABLE OPTICAL ATTENUATOR HAVING SEALING GASKET

(75) Inventor: Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 44 days.

(21) Appl. No.: 10/036,201

(22) Filed: Dec. 24, 2001

(65) Prior Publication Data

US 2003/0045149 A1 Mar. 6, 2003

(30) Foreign Application Priority Data

Aug. 29, 2001 (TW) ...................................... 90214805 U

(51) Int. Cl.7 ................................................ G02B 6/00
(52) U.S. Cl. ........................... 385/140; 385/73; 385/72; 385/60
(58) Field of Search ............................ 385/140, 72, 60, 385/73

(56) References Cited

U.S. PATENT DOCUMENTS 5,187,768 A * 2/1993 Ott et al. ..................... 385/140
6,529,673 B1 * 3/2003 Liu et al. ..................... 385/140
2002/0181928 A1 * 12/2002 Chen et al. .................. 385/140

* cited by examiner

Primary Examiner—Robert H Kim
Assistant Examiner—George Y. Wang
(74) Attorney, Agent, or Firm—Wei Te Chung

(57) ABSTRACT

A manual variable optical attenuator (10) includes a base (2), a cover (3), an optical module (4), a shifting device (5), and an optical fiber retainer (6). The optical module comprises a mirror (41), a frame (42), a dual optical fiber collimator (43), a stopper (44), a graded transmittance filter (45), and a filter carrier (46). The shifting device comprises a screw pole (51), a first holder (52), and a second holder (53). The screw pole comprises a terminal portion (511) rotatably received in the first holder, a first annular groove (512) accommodating the second holder, a second annular groove (513) receiving a gasket (514), an adjusting slot (515), and a screw thread (516). The gasket protrudes from a circumferential surface of the screw pole and seals a gap between the screw pole and a sidewall (36) of the cover. External harmful contamination cannot penetrate into the attenuator.

17 Claims, 6 Drawing Sheets

MANUAL VARIABLE OPTICAL ATTENUATOR HAVING SEALING GASKET

BACKGROUND OF THE INVENTION

1. Field of the Invention

The present invention relates to variable optical attenuators, and particularly to a manual variable optical attenuator having a sealing gasket.

2. Description of Prior Art

Optical attenuators are widely used in optical transmission systems and optical networks. A variable optical attenuator is a passive optical component used to reduce optical power propagating in an optical fiber. The variable optical attenuator can provide a range of attenuations to meet changing demands on the optical network. Variable optical attenuators may be categorized as either electrical or manual. Manual variable optical attenuators have relatively simple structures, and are more widely used in optical transmission systems and optical networks.

Internal optical components of an attenuator must remain clean and dry, to ensure proper operation. Referring to FIGS. 7 and 8, a conventional manual variable optical attenuator comprises a graded transmittance filter, a filter carrier, a screw pole and a housing. The filter is mounted on the filter carrier. An end of the screw pole is rotatably held in a sidewall of the housing, and is exposed to an outside of the housing. A screwdriver is engaged with the end of the screw pole to rotate the screw pole. The screw pole thus drives the filter carrier to shift the filter across a path of light passing through the attenuator. The desired amount of attenuation can thus be obtained. However, a gap exists between the screw pole and the housing at the hole. The gap allows external harmful contamination such as water vapor and dust to penetrate into the attenuator.

SUMMARY OF THE PRESENT INVENTION

An object of the present invention is to provide a manual variable optical attenuator having a gasket for improving sealing.

To achieve the above object, a manual variable optical attenuator in accordance with the present invention comprises a base, a cover, an optical module, a shifting device and an optical fiber retainer. The optical module comprises a mirror, a frame, a dual optical fiber collimator, a stopper, a graded transmittance filter, and a filter carrier. The shifting device comprises a screw pole, a first holder, and a second holder. The screw pole comprises a terminal portion rotatably received in the first holder, a first annular groove accommodating the second holder, a second annular groove receiving a gasket, an adjusting slot, and a screw thread. The gasket protrudes from a circumferential surface of the screw pole and seals a gap between the screw pole and a sidewall of the cover. The gasket thus effectively prevents external harmful contamination such as water vapor and dust from penetrating into the attenuator. Excellent sealing enables the attenuator to operate with minimal insertion loss throughout the lifetime of the attenuator.

Other objects, advantages and novel features of the invention will become more apparent from the following detailed description when taken in conjunction with the accompanying drawings, in which:

DETAILED DESCRIPTION OF PREFERRED EMBODIMENTS OF THE PRESENT INVENTION

Figure 1:
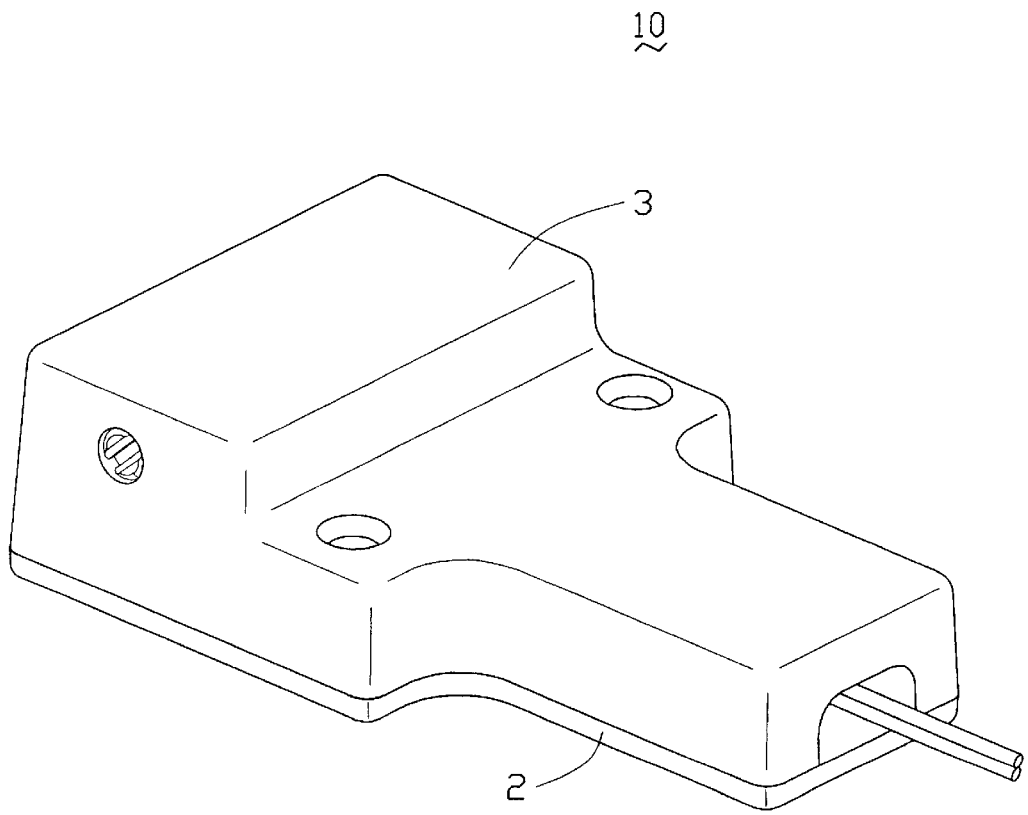
FIG. 1 is a perspective view of a manual variable optical attenuator in accordance with the present invention.
Figure 2:
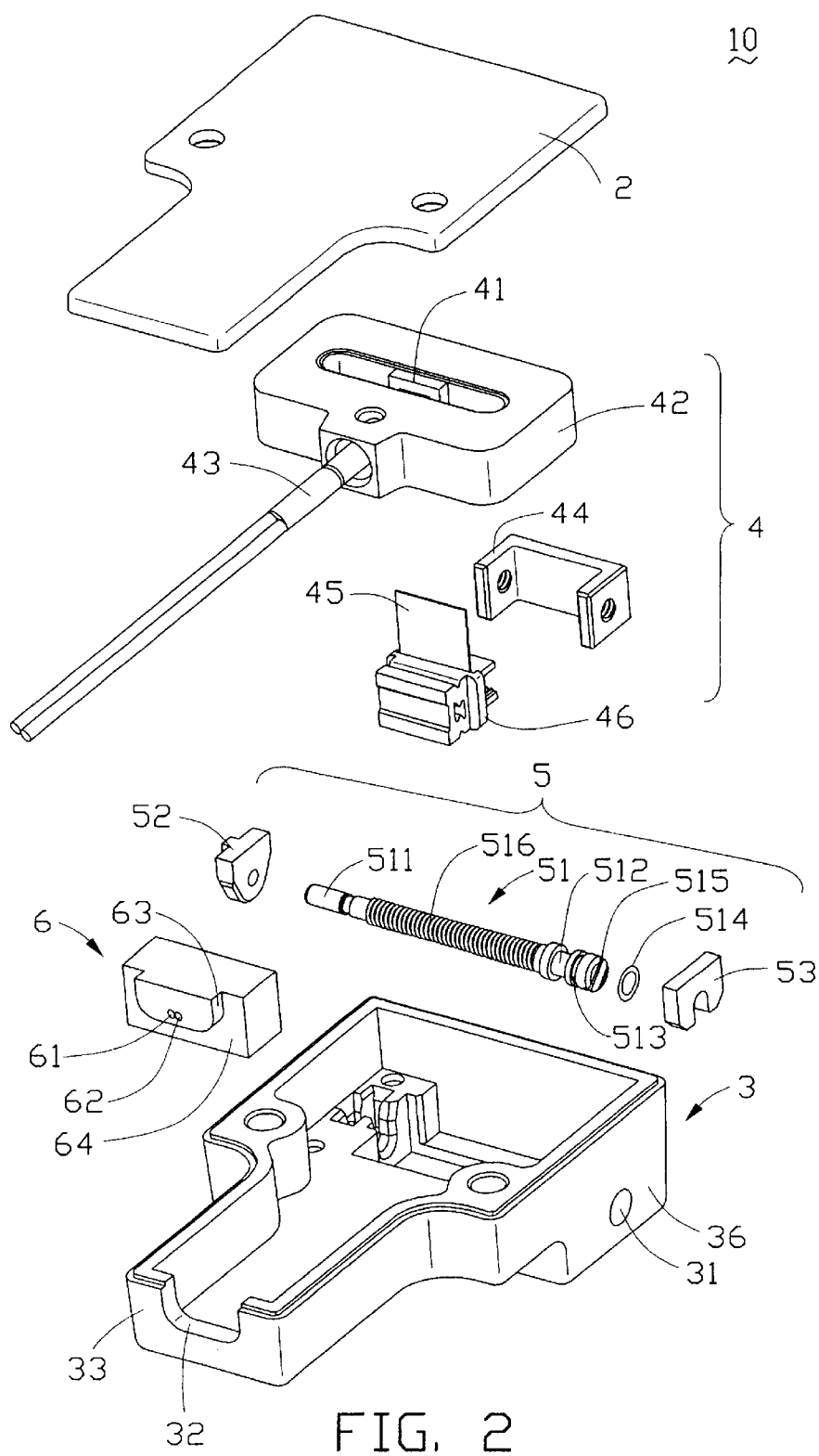
FIG. 2 is an exploded view of the attenuator of the FIG. 1.
Figure 3:
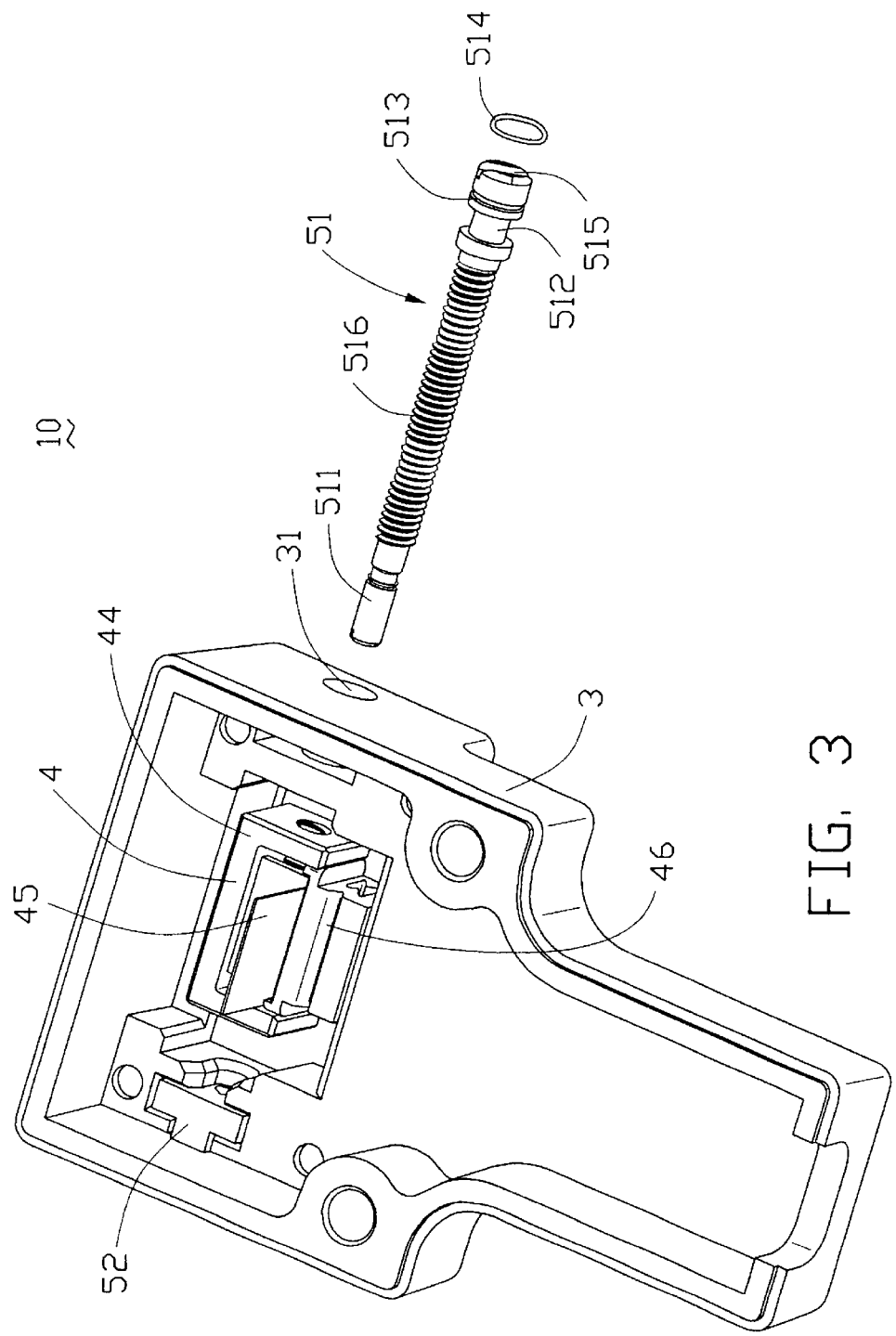
FIG. 3 is a partly assembled view of parts of the attenuator of the FIG. 2, including a cover, parts of an optical module, a screw pole and a gasket.
Figure 4:
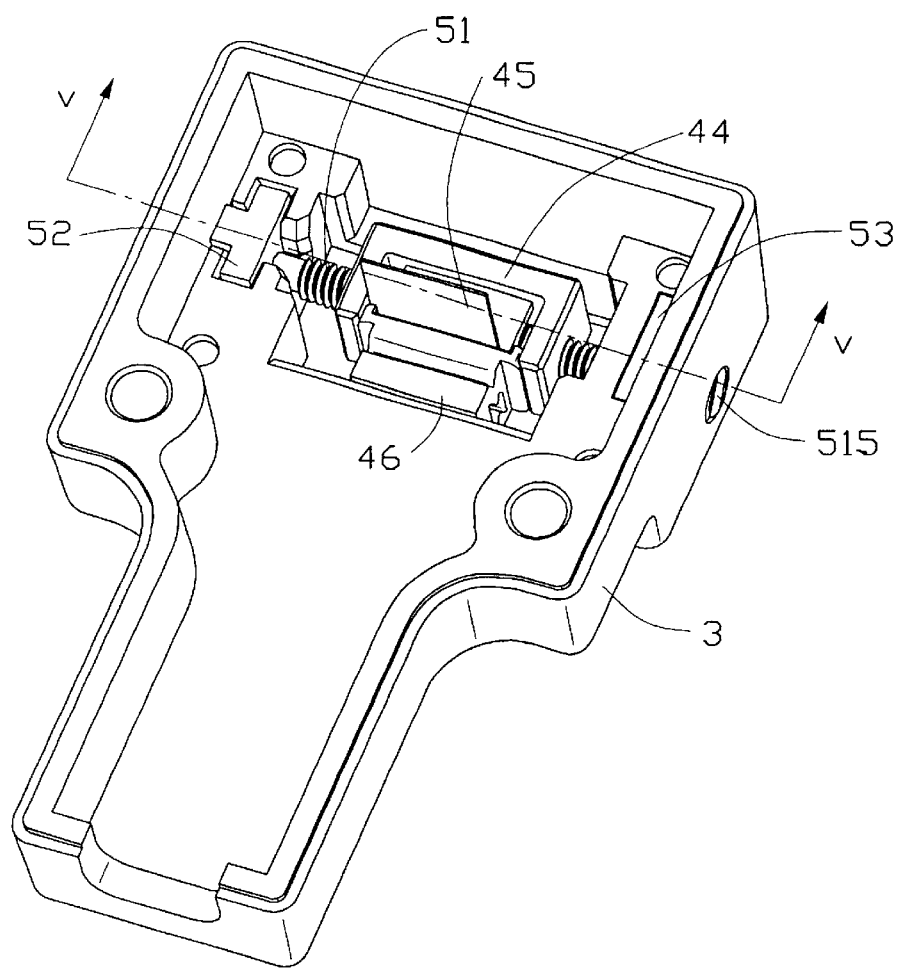
FIG. 4 is an assembled view of FIG. 3.
Figure 5:
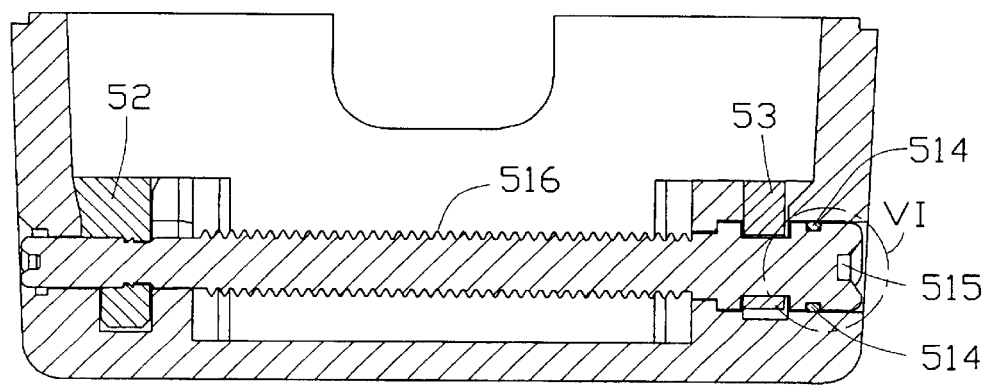
FIG. 5 is a cross-sectional view taken along line V—V of FIG. 4, but not showing the parts of the optical module.

Referring to FIGS. 1 and 2, a manual variable optical attenuator 10 in accordance with the present invention comprises a base 2, a cover 3, an optical module 4, a shifting device 5, and an optical fiber retainer 6. The cover 3 is attached to the base 2, which together cooperatively encase the optical module 4, the shifting device 5 and the optical fiber retainer 6.

Figure 6:
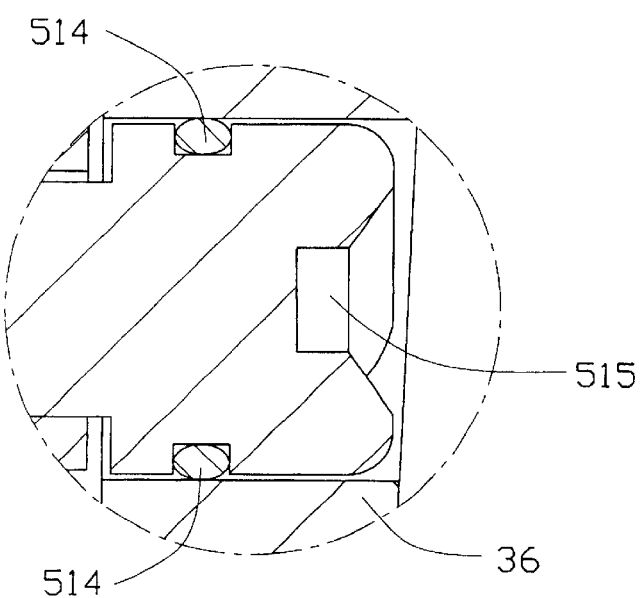
FIG. 6 is an enlarged view of a circled portion VI of FIG. 5.
Figure 7:
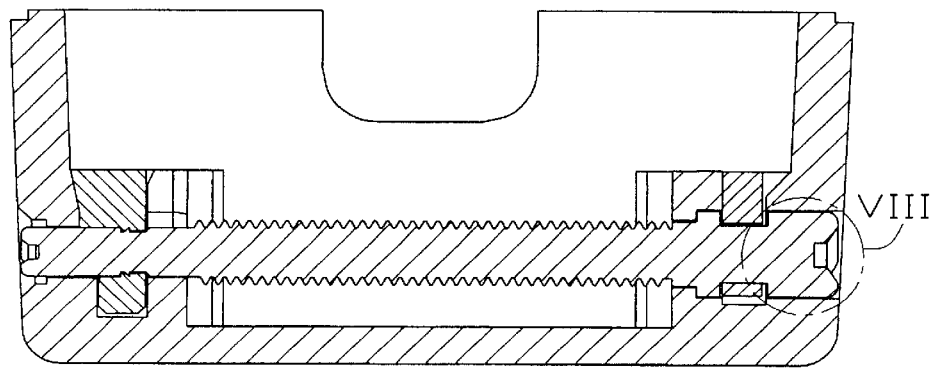
FIG. 7 is a cross-sectional view of a conventional manual variable optical attenuator, but not showing parts of an optical module thereof.
Figure 8:
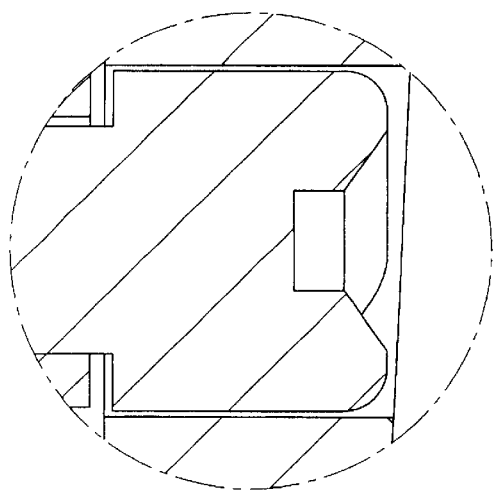
FIG. 8 is an enlarged view of a circled portion VIII of FIG. 7.

Referring to FIGS. 2 and 6, the cover 3 comprises a hole 31 defined in a sidewall 36 of a main body thereof. The cover 3 further comprises a front wall 33, and a front cutout 32 defined in the front wall 33.

The optical module 4 comprises a mirror 41, a frame 42, a dual optical fiber collimator 43, a U-shaped stopper 44, a graded transmittance filter 45, and a filter carrier 46. The filter 45 is mounted on the filter carrier 46. The filter 45 has a graded transmittance distribution from one lateral end thereof through to an opposite lateral end thereof. The frame 42 has an internal cavity for accommodating the mirror 41 and movably accommodating the filter 45. An input optical fiber (not labeled) and an output optical fiber (not labeled), respectively inputting and outputting optical signals, connect with the optical module 4 through the dual optical fiber collimator 43.

The shifting device 5 comprises a screw pole 51, a first holder 52, and a second holder 53. The screw pole 51 comprises a terminal portion 511 at one end thereof, a first annular groove 512 defined near an opposite end of the screw pole 51, a second annular groove 513 defined between the first annular groove 512 and the said opposite end of the screw pole 51 for receiving a gasket 514, an adjusting slot 515 defined in an end face of the said opposite end of the screw pole 51, and a screw thread 516 formed between the terminal portion 511 and the first annular groove 512.

The first holder 52 has a hole (not labeled) defined therein, for rotatably receiving the terminal portion 511. The second holder 53 has an arch-shaped cutout defined therein, to enable the second holder 53 to be accommodated in the first annular groove 512 of the screw pole 51.

The gasket 514 has a round or elliptical profile. A thickness of the gasket 514 is greater than a depth of the second annular groove 513, to enable the gasket 514 to protrude from a circumferential surface of the screw pole 51. The gasket 514 is made of material that is strong, elastic, scratch-resistant and durable. Such material may include rubber, plastic, metal or ceramic. When precisely machined, ceramic provides excellent sealing. However, ceramic has relatively poor elasticity.

The optical fiber retainer 6 comprises an input aperture 61, an output aperture 62, a step block 63, and a main block 64. The step block 63 is formed at a front of the main block 64. The input and output apertures 61, 62 are defined through both the step block 63 and the main block 64.

Referring to FIGS. 3–6, in assembly, the first holder 52 is received in a corresponding slot (not labeled) of one sidewall of the main body of the cover 3 that is opposite to the sidewall 36. The U-shaped stopper 44 and the filter carrier 46 are placed in the main body of the cover 3, with the U-shaped stopper 44 surrounding the filter carrier 46. The gasket 514 is received in the second annular groove 513 of the screw pole 51. The screw pole 51 is then inserted through the hole 31 and the U-shaped stopper 44, and threadingly engaged through the filter carrier 46. The terminal portion 511 of the screw pole 51 is rotatably received in hole (not labeled) of the first holder 52. The adjusting slot 515 of the screw pole 51 is exposed to an outside of the cover 3. The gasket 514 protrudes from the circumferential surface of the screw pole 51 and fills a gap between the screw pole 51 and the sidewall 36. The gasket 514 thus effectively prevents external harmful matter such as water vapor and dust from penetrating into the attenuator 10. The second holder 53 is received in a corresponding slot (not labeled) of the sidewall 36, and is partly accommodated in the first annular groove 512 of the screw pole 51. The input optical fiber (not labeled) is passed through the input aperture 61. The output optical fiber (not labeled) is passed through the output aperture 62. The sealing device 6 is placed in a front portion of the cover 3. The step block 63 of the sealing device 6 is fittingly received in the front cutout 32 of the cover 3. The main block 64 of the sealing device 6 fittingly abuts an inside of the front wall 33. The frame 42, the mirror 41, and the collimator 43 are then placed over and around the filter 45. Finally, the base 2 is attached to the cover 3 by conventional means.

In the preferred embodiment, the gasket 514 protrudes from the circumferential surface of the screw pole 51 and fills the gap between the screw pole 51 and the sidewall 36. The gasket 514 thus cooperates with the sidewall 36 to seal the attenuator 10 and protect the attenuator 10 from being penetrated by harmful contamination such as water vapor and dust. Any insertion loss of the attenuator 10 due to contamination is minimized. Furthermore, excellent sealing enables the attenuator 10 to operate with minimal insertion loss throughout the lifetime of the attenuator 10.

In an alternative embodiment of the present invention, more than one gasket 514 may be received in more than one second annular groove 513. This further enhances sealing of the attenuator 10.

Other modifications and adaptations of the above-described embodiments of the present invention may be made to meet particular requirements. This disclosure is intended to exemplify the invention without limiting its scope. All modifications that incorporate the invention disclosed in the preferred embodiments are to be construed as coming within the scope of the appended claims or the range of equivalents to which the claims are entitled.

I claim:

1. A manual variable optical attenuator comprising:
a base;
a cover having a sidewall and defining a hole in the sidewall;
a shifting device comprising a screw pole with screw threads thereon, gasket sealing a gap between the screw pole and the sidewall, and a holder which is located in a slot in said side wall for preventing axial movement of the screw pole relative to the cover;
an optical module comprising a mirror, a frame, a dual optical fiber collimator, a stopper, and a graded transmittance filter mounted on a filter carrier, wherein said frame accommodates said mirror and movably accommodates the filter, the screw pole is inserted through the hole and the stopper and threadingly engage with the filter carrier, and said stopper is used to prevent the filter carrier from moving too far to either side of the screw pole; and
an optical fiber retainer.

2. The manual variable optical attenuator as described in claim 1, wherein the shifting device further comprises another holder.

3. The manual variable optical attenuator as described in claim 2, wherein the screw pole comprises a terminal portion rotatably received in said another holder, a first annular groove accommodating said another holder, and a second annular groove receiving the gasket.

4. The manual variable optical attenuator as described in claim 1, wherein an adjusting slot is formed on a head of the screw pole and is exposed to an exterior.

5. The manual variable optical attenuator as described in claim 1, wherein the shifting device comprises two or more gaskets.

6. The manual variable optical attenuator as described in claim 1, wherein the gasket has a round or elliptic profile.

7. The manual variable optical attenuator as described in claim 3, wherein the gasket has a thickness substantially greater than a depth of the second annular groove it is received in.

8. The manual variable optical attenuator as described in claim 1, wherein the gasket protrudes from a circumferential surface of the screw pole and fills the gap between the screw pole and the sidewall.

9. The manual variable optical attenuator as described in claim 1, wherein the gasket is made of material selected from the group consisting of rubber, plastic, metal and ceramic.

10. A manual variable optical attenuator comprising:
a base;
a cover defining an interior space and a side wall with a hole therethrough;
an optical module received within said interior space;
a shifting device including a screw pole, with screw threads thereon, inserted into the interior space from said through hole and being rotatable while not linearly moveable in said interior space;
an adjusting slot formed on a head of said screw pole and exposed to an exterior;
a large first annular groove positioned between said screw threads and said adjusting slot;
and a small second annular groove positioned between said first annular groove and said adjusting slot; wherein said first annular groove receives a holder which is located in a slot in the side wall for preventing axial movement of the screw pole relative to the cover, and said second annular groove receives a gasket for sealing a gap between the head of said screw pole and sides of said through bole.

11. The manual variable optical attenuator as described in claim 10, wherein the optical module comprises a mirror, a frame, a dual optical fiber collimator, a stopper, and a graded transmittance filter mounted on a filter carrier.

12. The manual variable optical attenuator as described in claim 10, wherein the shifting device further comprises another holder.

13. The manual variable optical attenuator as described in claim 12, wherein the screw pole comprises a terminal portion rotatably received in said another holder.

14. The manual variable optical attenuator as described in claim 10, wherein the shifting device comprises two or more gaskets.

15. The manual variable optical attenuator as described in claim 10, wherein the gasket has a thickness substantially greater than a depth of the second annular groove where it is received.

16. The manual variable optical attenuator as described in claim 10, further comprising an optical fiber retainer.

17. The manual variable optical attenuator as described in claim 16, wherein said cover has a front wall defining a cutout, said optical fiber retainer has a main block and a step block, and the main block fittingly abuts an inside of the front wall, and the step block is fittingly received in the front cutout.

* * * * *